March 4, 1952     B. WILSON     2,588,189
APPARATUS FOR PRECOOLING
Filed June 6, 1945     6 Sheets-Sheet 1

Inventor
BROADUS WILSON,
By Elizabeth Newton Dew
Attorney

March 4, 1952  B. WILSON  2,588,189
APPARATUS FOR PRECOOLING
Filed June 6, 1945  6 Sheets-Sheet 2

Inventor
BROADUS WILSON,
By Elizabeth Newton Dew
Attorney

March 4, 1952     B. WILSON     2,588,189
APPARATUS FOR PRECOOLING
Filed June 6, 1945     6 Sheets-Sheet 5

Inventor
BROADUS WILSON,
By Elizabeth Newton Dew
Attorney

March 4, 1952　　　　B. WILSON　　　　2,588,189
APPARATUS FOR PRECOOLING

Filed June 6, 1945　　　　　　　　　　　　6 Sheets—Sheet 6

Inventor
BROADUS WILSON

By Elizabeth Newton Dew
Attorney

Patented Mar. 4, 1952

2,588,189

UNITED STATES PATENT OFFICE 2,588,189

APPARATUS FOR PRECOOLING

Broadus Wilson, Raleigh, N. C.

Application June 6, 1945, Serial No. 597,813

2 Claims. (Cl. 98—6)

This invention relates to an apparatus for pre-cooling a load of perishable products, such as fruits or vegetables, in a shipping compartment, such as a refrigerator car, and just prior to shipment.

It is an object of the invention to provide an apparatus for pre-cooling a shipping compartment, such as a refrigerator car, by circulating chilled fluid in a definite predetermined path and in periodically reversing the flow of fluid through the load.

Another object is to provide a novel mechanism whereby the flow of fluid may be quickly, easily, and automatically reversed, as aforesaid.

A further object is to provide means whereby the rate of flow of cooling fluid through the load is so coordinated with the temperature rise of the fluid between the time it enters and leaves the load, as to maintain substantially constant the total amount of heat extracted from the load per unit of time.

A still further object is to provide a chilled fluid circulating means wherein a portion of the fluid is recirculated in contact with a heat exchanger without passing through the load when, as a result of an excessive rate of circulation of fluid through the load, the refrigerating apparatus cannot maintain a predetermined desired low temperature of the fluid entering the car.

Another object is to provide baffles within the car and so related to the load as to positively establish a predetermined efficient path over and through the load that the cooling fluid must traverse in passing from the entrance duct to the exit duct of the car.

Yet another object is to provide a flexible blanket suitable for use as a baffle as explained in the preceeding paragraph, and which, at the same time, acts as a heat exchange device to aid in the rapid and efficient cooling of the load.

A further object is to provide a novel blanket as aforesaid, that affords a continuous passage for chilled fluid from inlet to exhaust connections and which acts both to directly extract heat from the load and, at the same time, from the cooling fluid, to keep the temperature of the fluid low as it passes over and through the load.

Another object is to provide inflatable baffles positionable within the car and adapted to cause the cooling air to flow in a desired path, and which are held in position merely by the act of inflation, so as to be easily positioned within and withdrawn from the car.

A further object is to provide inflatable sealing means whereby all spaces between the door opening of the car and the air ducts, closure walls, etc., are effectively sealed against leakage of cooling fluid and consequent loss of energy.

Another object is to provide an apparatus for storing large amounts of cooling energy in a liquid solution having a relatively small volume.

Another object is to provide an apparatus for cooling warmed liquid by mixing or modulating said liquid with a mass that, while liquid as a whole, contains a substantial percentage of volume of minute ice particles or crystals whereby the heat absorbed by the melting ice particles is utilized to cool the warmer liquid returning from the working heat exchanger.

A still further object is to store large amounts of cooling energy in relatively small volume, by extracting a substantial amount of the so-called "heat of fusion" while maintaining the cooling liquid in a state enabling it to be pumped and forced through heat exchange coils.

Other objects and advantages of my invention will become apparent as the description advances.

In the drawings:

Fig. 3 is a sectional plan view, taken substantially upon the line 3—3, Fig. 10, and showing a loaded refrigerator car with the heat exchange blankets and baffles in place, connections for controlling the supply of cooling fluid to said blankets, and ducts for supplying cooling fluid to and exhausting it from, the car.

The chilled air circulating system

In a preferred form of my invention, pre-cooling is effected by circulating cooled or chilled air over and about the load of perishable foodstuffs or other material in the car or other compartment, to rapidly lower the temperature of the load. There are many advantages in this procedure. First, the rapid cooling immediately after loading, greatly retards the start of decomposition of the load so that a much greater proportion thereof arrives at its destination in wholesome and saleable condition whereby losses in shipment are reduced. Secondly, the amount of bunker ice necessary to keep the load at a desired low temperature is decreased. Thirdly, the high labor costs and delays inevitable where bunkers must be frequently iced, are reduced to a minimum.

Figure 1:
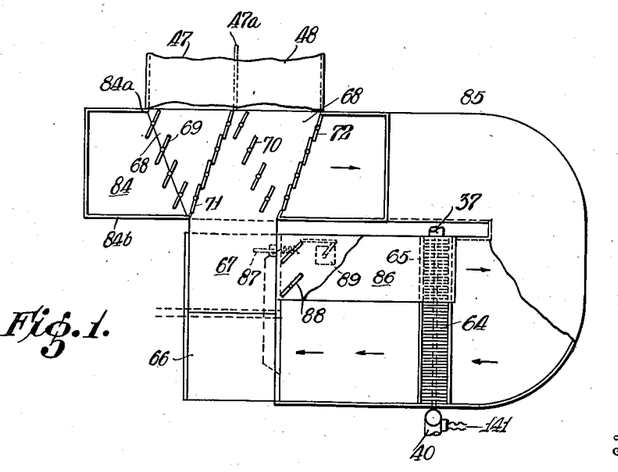
Fig. 1 is a plan view of the means for conditioning, and re-circulating cooling fluid, with certain top wall sections removed to show the interior construction more clearly, particularly the vanes by which the direction of flow of chilled air through the car is periodically reversed.
Figure 2:
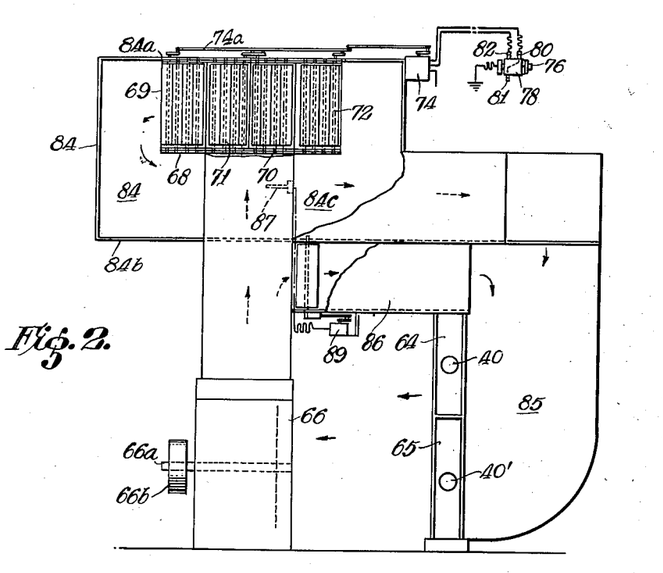
Fig. 2 is an elevation of the mechanism shown in Fig. 1 showing the re-circulating passage, the blower, the flow control vanes, and the periodically operated motor for operating the vanes.

At Figures 1 and 2, I have shown a mechanism for cooling and circulating air over and about the load, for the purpose of pre-cooling the same. This mechanism is located closely adjacent the opening of the car through which the cooling air is to be introduced and exhausted and consists of sheet metal walls defining the various passageways to and from the car, together with heat exchange coils, blower, shutters, and other auxiliaries subsequently to be explained and described.

A box-shaped compartment or element 84 has an opening in the top central portion 84a of one side wall. A pair of ducts 47 and 48, separated by a partition 47a, have their end edges fitting and secured, as by welding, to the edges of said opening. The side wall 84b of element 84 opposite wall 84a, has a second opening therein from which leads a duct 67. This second opening is one-half the size of the one through which ducts 47 and 48 communicate. Both openings extend to and are flush with the top of the element 84 as is clear from inspection of Fig. 7. A trapezoidal shaped plate or sheet 68 has its longer and shorter edges secured to the corresponding lower edges of the openings in walls 84a and 84b, respectively. It will be noted from Fig. 2, that this plate is positioned approximately half-way between the top and bottom of element 84 so as to leave a passageway 84c therebeneath. In the preferred construction shown, the top of box-shaped element 84 is flush with the tops of ducts 47 and 48.

Four series of shutters or dampers 69, 70, 71 and 72, respectively, are arranged as shown at Fig. 1. As shown, each series consists of four shutters or louvres. Shutters 69 are pivoted at one end on and along one side edge of trapezoidal plate 68 and at their other ends in the top wall of box 84. These shutters are so arranged that they may be pivoted from the open position shown, to a closed position in which their edges contact and overlap to effectively close the opening between duct 47 and box 84. Shutters 72 are pivoted in the same manner as shutters 69 on and along the opposite side edge of plate 68 and are arranged to be simultaneously pivoted from a position, as shown, in which they overlap and close the passageway from duct 48 to the lower portion of box 84, to a position in which said passageway is substantially free and unobstructed. Shutters 71 are pivoted on parallel axes lying in a plane determined by the adjacent edge of partition 47a and one opposite corner of plate 68, so that, when in the position shown, they coact to effectively close the passageway between ducts 47 and 67 while, when pivoted to the other extreme position similar to that shown for shutters 70 upon Fig. 1, said passageway is substantially open and unobstructed. Shutters 70 are similarly pivoted for movement upon parallel axes lying in a plane determined by the adjacent edge of partition 47a and an end point of the opposite edge of plate 68. In the position shown these shutters 70 are open to afford access between ducts 48 and 67.

Figure 1A:
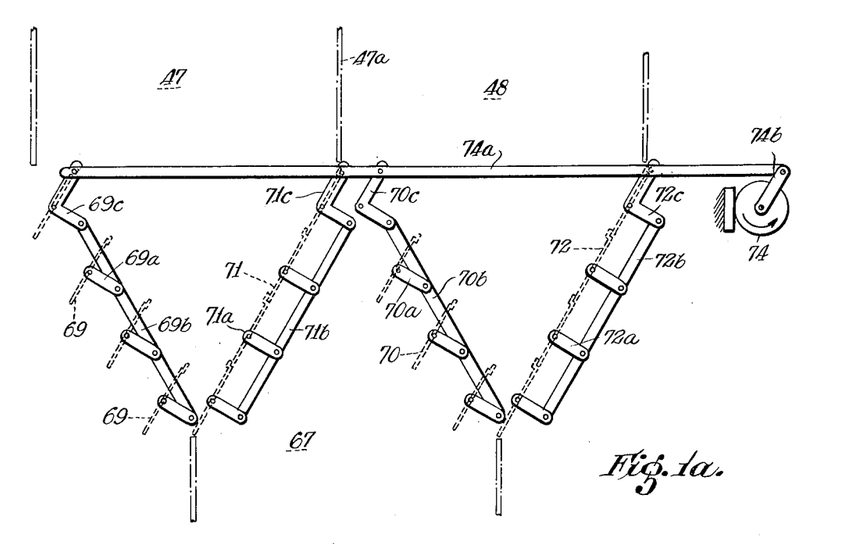
Fig. 1a is an enlarged view looking downwardly upon Fig. 1 to show more clearly the arrangement of links by which the flow-directing and reversing vanes are simultaneously actuated.

Each of the shutters is mounted upon a pivot shaft that, at one end, projects through the top wall of the box 84, as shown at Fig. 2, where it is provided with a lever arm 69a, 70a, etc., Fig. 1a, wherein the shutters themselves, are shown in dotted lines. The lever arms of each series of shutters, are connected by a connecting rod. For example, lever arms 69a, are connected for movement in unison, by rod 69b and the other series of levers are connected by rods 70b, 71b and 72b, as will be obvious from inspection of Fig. 1a. Corresponding ones of each of the series of levers are in the form of bell cranks, 69c, 70c, 71c and 72c, having arms connected for movement in unison by a single actuating bar 74a. This bar is pivotally connected at one end to a crank 74b of a motor 74, controlled in a manner subsequently described.

By the foregoing described construction, when the shutters, levers, and other movable parts, are in the position shown at Figs. 1 and 1a, duct 47 is in communication with the interior of box 84, while shut off from duct 67. At the same time, duct 48 is in communication with duct 67 while shut off from the interior of box 84. On the other hand, when motor 74 is operated in the direction indicated by the arrow, Fig. 1a to its other extreme position, shutters 69 are moved into a position in which they coact to shut off communication between duct 47 and box 84 while shutters 71 open to afford communication between ducts 47 and 67. At the same time, shutters 70 and 72 are pivoted to close off communication between ducts 48 and 67 and to open duct 48 to the interior of box 84.

As shown at Fig. 2, the right lower end wall of box 84 has an opening in communication with a duct 85 having a return bend. This return bend has positioned therein a pair of heat-exchange coil elements 64 and 65 by which air circulating through the ducts may be brought into heat-exchange relation with chilled water circulated through said coils from tank 4, as by means of a pump 34, Fig. 4, and supply pipes extending from the discharge or pressure side of the pump to the bottom of said coils and exhaust pipes leading from the top of the coils to the top of tank 4.

A blower 66 that may be of the centrifugal type, has a shaft 66a driven by a pulley 66b from a source of power, not shown. The discharge from blower 66 is connected to duct 67, while the intake is positioned to draw air through and over coils 64 and 65.

There is a re-circulating duct 86 communicating at one end with supply duct 67, and at the other end with duct 85. Shutters 88 are pivotally mounted within this duct and are adapted, in one position, to close said duct. These shutters are operated and controlled by a motor 89 connected with the shutters as by means of crank arms and connecting rods in the manner previously described for shutters 69, etc. Thus, when motor element 89 is in one limiting position, duct 86 is open, while, when said motor is in its other limiting position, the duct is closed. A thermostatic element 87 is located within supply duct 67, to be responsive to the temperature of the air supplied to duct 47 or duct 48. This thermostat is connected to motor element 89 whereby shutters 88 are moved to open by-pass duct 86 when the temperature of air leaving duct 67 rises above a predetermined value. The purpose of this will be presently described.

A telechron motor 76 is located at a convenient control panel of the unit and is connected to rotate a commutating element 78 having contacts and brushes 80, 81 and 82 arranged and electrically connected to reverse motor 74 at predetermined periodic intervals. The speed of the motor 76 may be selectively varied to correspondingly vary the period of rotation of commutating element 78. Thus, at one position of rotation of element 78, the shutters 69, 70, 71 and 72 are moved to the position shown at Figs. 1 and 1A, while at a later time, equal to one-half the adjusted period of rotation of commutating element 78, motor 74 is reversed to move all shutters into the other limiting position.

In operation, ducts 47 and 48 are placed in communication with the car so that the air emerging from one will be forced to pass through the load before returning to the other. Pump 34 is started to circulate cold liquid from tank 4 through coils 64 and 65 and blower 66 is started by energizing the motor belt-connected to pulley 66b. Under these conditions, and with the shutters arranged as shown in Fig. 1, chilled air is discharged from duct 67, past open shutters 70, to duct 48. From duct 48, the air is forced through the load in the car where it absorbs heat therefrom and then returns by way of duct 47, past open shutters 69, downwardly and laterally through box 84 beneath plate 68 and thence through return duct 85 to and across coils 64 and 65. As the air passes through these coils, the heat it has absorbed from the load is transferred to the cooling water circulating through coils 64 and 65 to again lower the temperature of the air. After emerging from coils 64 and 65, the chilled air is drawn into the intake of the fan and is again circulated through the load.

I have found that, for a given load to be cooled, there is an optimum volume of air and entrance temperature for the most efficient cooling. Too much air at too high a temperature, will result in too great a loss in weight of the products constituting the loading. On the other hand, too little circulation will add undesirably to the time and expense required for pre-cooling. For a given load, cooling should be carried out with air at the lowest practicable temperature and a rate of circulation thereof such as will bring the entire load to the desired low shipping temperature within the time available — say 2 to 4 hours. My air circulating and cooling system makes certain that the entering air is at the desired low temperature by by-passing and re-circulating a portion thereof over the cooling coils without passing over and about the load, when the temperature difference between the load and entering air is so large that the cooling coils are incapable of maintaining said difference by direct re-circulation only. This will be true particularly during the initial stage of pre-cooling. Thus, supposing that cooling has started but that the air passing through duct 67, tends to rise because of too great a rate of circulation over and through the load. Under such conditions, thermostat 87 operates to open shutters 88 whereby a portion of the air delivered by blower 66, is by-passed through duct 86 and re-circulated through coils 64 and 65 to thereby further lower the temperature of said portion. This portion is then mixed with the air coming from the load. As the amount that shutters 88 are opened will depend upon the amount that the temperature of the air passing to the load rises above a predetermined optimum temperature of chilled air, the amount of air thus by-passed will also depend upon said temperature rise. Hence, my system automatically operates to, at one and the same time, reduce the amount of air passing over and through the load and to maintain the desired low temperature of entering air. In short, each job of pre-cooling is done with the temperature of the entering air as low as possible, and with only the amount of circulation at which said low temperature can be maintained. Not only does this system cool the load at the most desirable rate, it also tends to flatten out the load curve on compressor 1. For example, as the temperature of the load drops and approaches the temperature of the chilled air entering the car, the shutters 88 will close proportionately, and thereby increase the amount of air circulating through the load per unit of time. Since the rate of heat absorption from the load is proportional both to the temperature difference between the chilled air and the rate of circulation thereof, it will be apparent that my system tends to maintain constant the load upon the compressor 1 so that it may be at all times operated at substantially maximum efficiency.

The periodic reversal of the flow of cooling fluid through the load is another important feature to be noted. For example, it is clear that, where the flow is continuously in one direction, as in prior art systems, there is a temperature gradient throughout the path of the cooling fluid. This is caused by the fact that the cooling fluid gradually rises in temperature as it absorbs heat from the load and, on exit from the compartment, is at a considerably higher temperature than when it entered the load. As the heat absorbed for a given rate of circulation, is proportional to the temperature difference between the load and cooling fluid, it is clear that less heat can be absorbed per unit of time at a point, for example, where the fluid is about to leave the load, than at a point where it has just entered the load. This temperature gradient is indicated at A—B, Fig. 11, where abscissae represent the length of the path of the cooling fluid through the load, and ordinates represent the amount of heat absorbed at the end of a given period of time. Since the amount of heat absorbed at different portions of the load varies in substantially straight-line proportion, it is clear that one-way flow inevitably results in difference in temperature along the path of flow. Thus, if the portion of the load adjacent the exhaust duct is lowered to the proper temperature, the portion of the load adjacent the entrance duct will likely be too low. In any event the pre-cooling period will be unnecessarily lengthened.

Figures 7, 11:
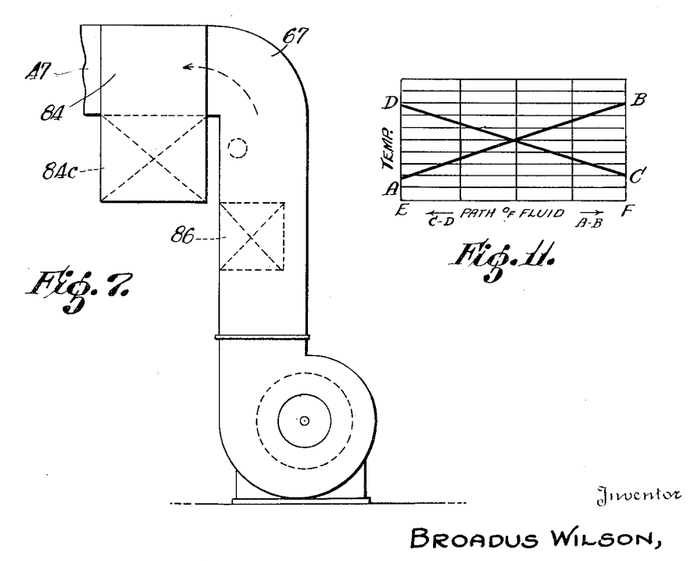
Fig. 7 is a view taken at the left-hand sides of Figs. 1 and 2, showing the arrangement of blower, discharge and re-circulating ducts.
Fig. 11 is a diagram showing the advantages obtained by periodic reversal of the flow of chilled fluid through the load.
Figure 8:
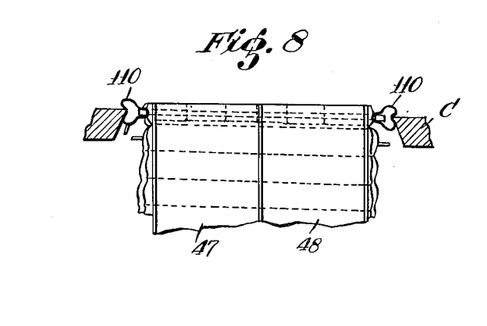
Fig. 8 is an enlarged detail of a portion of Fig. 3 to show more clearly the arrangement of entrance and exhaust ducts, together with the inflatable means for sealing the space between said ducts and the door opening of the car.

Now, when the flow is periodically reversed, as in my invention, the temperature gradient is also reversed so that at the end of two equal periods of flow in opposite directions, the amount of heat absorbed at any given point along the path of the fluid is equal to the sum of the two ordinates to lines A—B and C—D, and this sum is a constant for all points. Hence, by periodic reversal, all parts of the load are cooled evenly and heat is extracted smoothly and at the optimum rate for the temperature differences involved.

An additioinal advantage of the periodic flow reversal is that each time the direction of flow changes, the static pressure between the outside and inside of each container or crate in the load, will vary. This is because a pressure gradient from entrance to exhaust, is required to cause the cooling air to flow. In fact these pressure gradient lines would resemble the lines A—B and C—D so that, for each reversal, the static pressure at each point along the path of flow, will change by an amount proportional to the difference the ordinates to the two gradient lines for that point. This change, obviously reduces the time of cooling and solves one of the most difficult problems encountered in the pre-cooling of large masses of products, namely, getting the heat transferred from the inside of the containers or crates to the cooling fluid.

Figure 12:
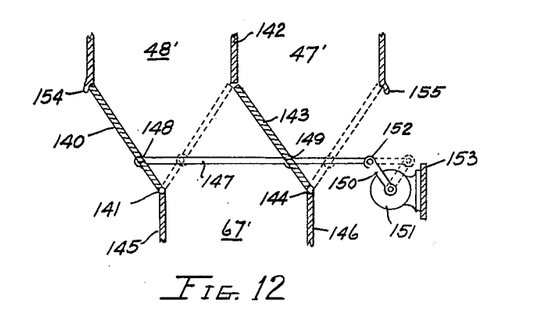
Fig. 12 is a sectional view of a slightly modified form of flow-reversing arrangement, the top cover being removed to show the vane operating mechanism more clearly.

In Fig. 12 I have shown a modification of the shutter arrangement disclosed in Figs. 1 and 1a, wherein 47', 48', and 67', indicate the ducts identified by corresponding numerals in Fig. 1a. A shutter or vane 140 is pivoted at one edge 141, to a contiguous edge of the wall 145 of duct 67'. Likewise a shutter or vane 143 is pivoted at one edge 144 to the edge of the opposite wall 146 of duct 67'. The vanes are thus adapted to be swung from the full line positions where they coact to place ducts 48' and 67' in communication, to the dotted line positions wherein ducts 47' and 67' are in communication. The effect is the same as in Figs. 1 and 1a, namely, to periodically reverse the flow of air through the car.

Operation of the vanes 140 and 143 is effected by a coupling rod 147, pivoted to a pin in vane 140, at 148, to a hinge pin in vane 143, as at 149, and at 152 to the arm 150 of a motor 151. Said motor is fixed to any convenient part of the framework, such as 153. If desired, stops 154 and 155 may be located along the edges of the outer walls of ducts 48' and 47' to assure substantially fluid-tight joints along the edges of the vanes. The operation will be obvious from the foregoing description. Motor 151 is reversed periodically to swing vanes between the full- and dotted-line positions to reverse the flow of cooling fluid through the car.

*The flexible blanket and baffle*

It is highly desirable to keep the pre-cooling period at a minimum in order that shipment may begin at the earliest time possible after loading has been completed. With this end in view, my invention includes a combined cooling blanket and baffle that rests upon the load and directs the chilled air in the desired path through the load while at the same time cooling the air passing thereover by radiation, convection and conduction.

Figure 6:
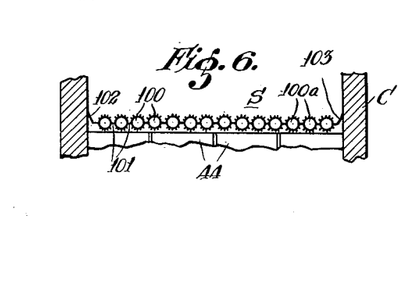
Fig. 6 is a sectional view taken upon the line 6—6, Fig. 3, showing one of the flexible combined heat-exchange and baffle blankets forming a part of my invention.
Figure 10:
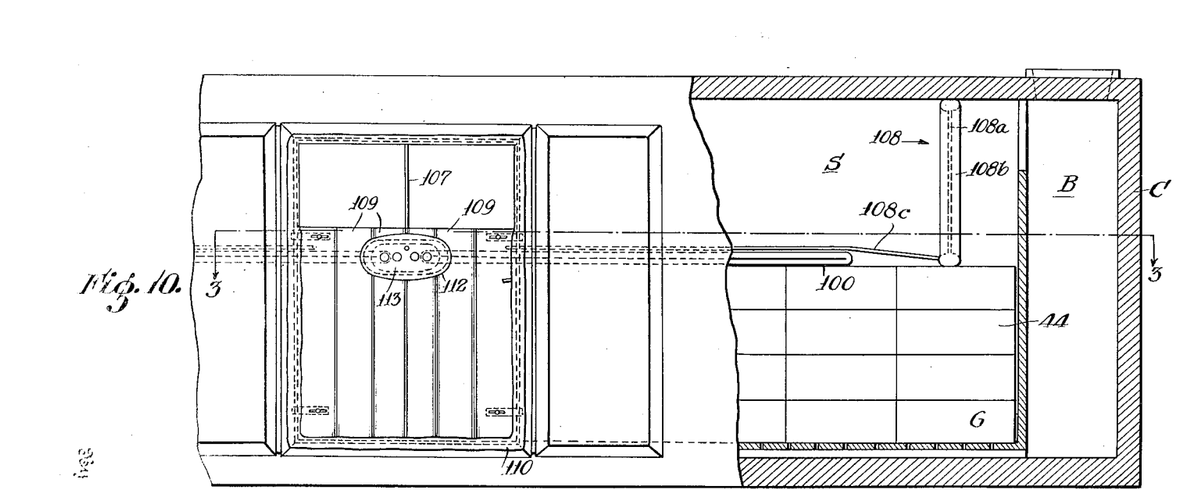
Fig. 10 is an elevational view of a refrigerator car, partly in section, to illustrate the arrangement of cooling blankets, inflatable baffles and car-entrance closure means, by which cooling fluid is directed in a definite desired path through the load.

Referring to Figs. 3, 6 and 10, C indicates the walls of a refrigerator car having the usual end bunker B for ice, and supporting grill G for the load 44 which may consist of crates, bags or other containers filled with perishable products. A space S is left between the top of the load and the roof of the car, not only to facilitate loading and unloading, but also to provide a passage for cooled air to and from the bunkers.

I have found that by providing a combined baffle and flexible heat exchange blanket to rest upon the load during pre-cooling, that more rapid and efficient cooling may be obtained. As shown more particularly at Figs. 3, 6 and 10, this blanket consists of a number of tubes 100. Each tube has radiating fins or ribs 100a formed on its exterior surface. The tubes are secured in side-by-side relation, as by means of integral webs 101. The outermost tubes at each edge are provided with flaps 102 and 103 to provide an effective seal between the blanket and the walls of the car. The tubes, webs and flaps may be formed integrally from rubber or rubberized fabric.

As will be clear from inspection of Fig. 3, adjacent tubes are so connected as to form a continuous passage from the tube at one edge through substantially the entire length of each tube, to the tube at the other edge, and a return header 104 is provided so that both entrance and exit couplings, 105 and 106, respectively, may be brought through a door opening at closely adjacent points. Fig. 3 shows that two identical blankets are used, one on each side of a central partition or baffle 107 that divides the car or the space between the top of the loading and the ceiling of the car. Each blanket extends from a position in contact with partition 107 about one-third the length of the car, to thereby leave a passageway through which the cooling fluid may move downwardly into, and upwardly from, the load.

At 108 I have shown a baffle that may consist of a relatively stiff central sheet 108a, having a flexible inflatable tubular element 108b, secured about its edges. Inflation of element 108b is effected from a point adjacent the car door, by means of an air hose connection 108c. Thus the baffle 108 may be put into position, as shown at Figs. 3 and 10, after which tube 108b is inflated to form an effective seal across the space above the load and also to securely hold itself in place without the use of any fastening or securing means. When pre-cooling is completed, the tube 108b may be deflated at the car door and the entire baffle pulled out by means of hose 108c. It will be understood that two such baffles are preferably used, one at each end of the car. These blankets 100, and baffles 107 and 108, co-operate to define a circuit or path over and along which the cooling air must flow. This path is, for example, from duct 48, to the right, as seen in Fig. 3, along the top of blanket 100, downwardly through the load between baffle 108 and the adjacent end of blanket 100, then leftwardly through the load to the left end, then upwardly between left baffle 108 and the adjacent end of left blanket 100, and finally rightwardly above said blanket to and out by way of duct 47. The path above outlined may be reversed periodically by operation of vanes 69, 70, etc., as previously described. Not only do blankets 100 direct the cooling air in the desired optimum path, they also assist in cooling the air passing thereover, and, at the same time, absorb heat directly from the load. By their use, the period formerly required for pre-cooling, is greatly reduced.

Figure 4:
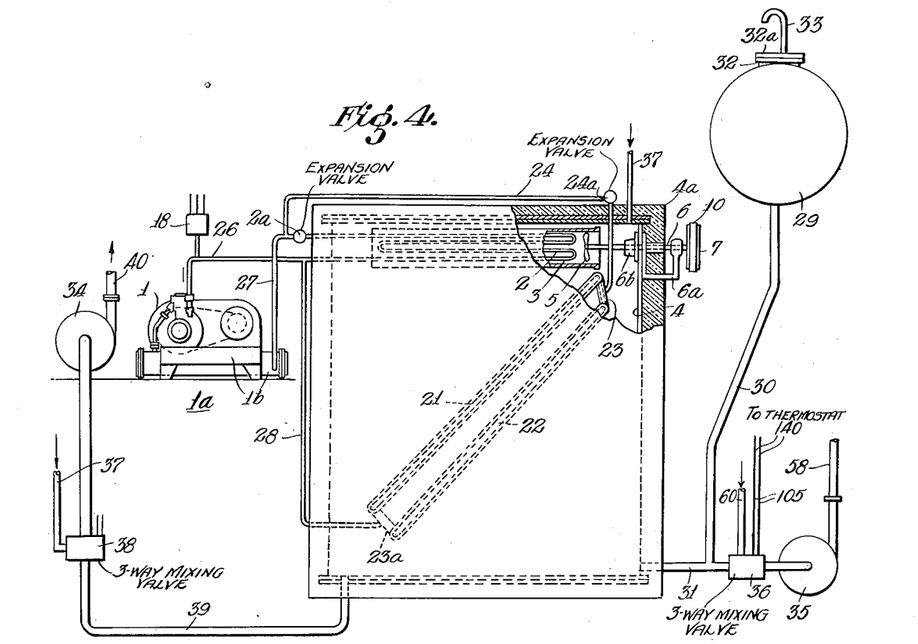
Fig. 4 is an elevatonal view of the tank for storing cooling liquid, parts being broken away to show more clearly the heat-exchange coils, the circulating propeller, together with a refrigerating unit for supplying refrigerant to the coils and pumps for circulating cooling liquid to the several heat-exchange units.

The supply header 105 has couplings, including valves 105a and 105b, by which chilled liquid is supplied to blankets 100 from pump 35, Fig. 4, and pipe 58. The liquid returns by way of header 106, provided with couplings for blanket headers 104, and with valves 106a and 106b. Precise control of the flow of liquid to each blanket is thus assured.

The ducts 47 and 48, as well as the various connections to blankets 100, extend through the door opening of the car. This opening is effectively sealed by an inflatable pad 109 that lies flat against the solid panel below ducts 47 and 48 when not in use, and that may be inflated to form a dead air insulating wall for the door area below ducts 47 and 48, as shown at Figs. 3 and 10. After the ducts and pad are in position, an inflatable tube 110 is inserted between the ducts and outer portions of the pad 109 and inflated by the application of air under pressure to nipples 111, Fig. 3. As shown at Fig. 10, pad 109 is recessed to form an opening 112 through which extend the pipes or headers 104, etc., leading to and from blankets 100 and 100'. An inflatable tube element 113, Fig. 10, surrounds these pipes and is so shaped as to effectively seal the opening when inflated through suitable valve connections, not shown. Heat insulating sheathing is preferably applied about ducts 47 and 48 to prevent undesired heat exchange between the ambient air and the cooled air entering and leaving the load. Thus, when all inflatable elements are in place, the car is hermetically sealed except for the entrance and exit ducts 47 and 48.

Figure 13:
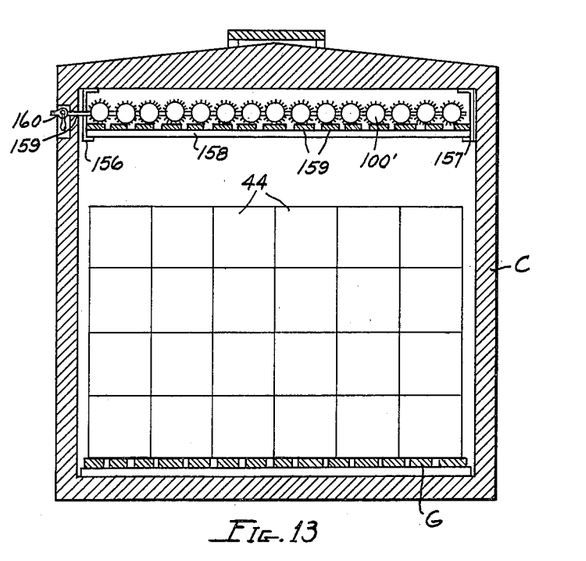
Fig. 13 is a cross section of a refrigerator car showing a flexible blanket installed adjacent the ceiling to effect cooling of the load during shipment.

In Fig. 13, the car C is provided with brackets 156 and 157 attached to the ceiling or upper portions of the side walls. A frame comprising cross pieces 158 and longitudinally-extending slats 159, is supported by brackets 156 and 157 in position adjacent the top of the car. A blanket that may consist of parallel tubes 100' formed and united as previously shown and described in connection with Figs. 3 and 6. The blankets may be more or less permanent installations and, with that idea in mind, are provided with connections such as 159a and valves 160, extending to the exterior of the car. It will be understood that each blanket is provided with two of these connections whereby it may be drained at intervals and refilled with chilled liquid at points along the route. In this way, the tank or blankets 100' may provide a cooling source auxiliary to the ice in the bunkers. Alternatively, it is contemplated that such blankets may entirely replace the ice bunkers now commonly located at the ends of the car. In that event, large savings in time and expense are possible, since the blankets may be rapidly drained and refilled with chilled liquid more rapidly than the ice bunkers can be filled, and at an appreciable saving in labor costs. Furthermore, the system afforded by the blankets in the top, is a decided advance over the bunker system at present used, since it is known that the ice in the lower portions of the bunkers is of little value in maintaining a low temperature in the car.

When lowering the temperature of a mass of relatively warm products such as freshly-picked fruits and vegetables, the initial rate at which a given size of coil will extract heat from the air that has circulated over and through said mass, is relatively high because of the high temperature difference between the refrigerant and the mass. For this reason the load upon the refrigerating unit is high during the initial period and many attempts have been made to devise means of storing cooling energy during "off-peak" periods of cooling so that such energy may be utilized during the initial period when the rate of heat transfer is most rapid and efficient. Practical solution of the problem will not only shorten the cooling period but will also enable the refrigerating plant to be continuously operated at near peak efficiency.

Attempts have been made to utilize the heat of fusion of ice in storing such cooling energy. So far as I am aware, none of these have been successful because the solutions and methods used resulted in mushy masses of ice and solution that not only required large amounts of power to force them through the pipes but were also troublesome because of frequently-clogged pipes and coils. For example, in one instance, it was attempted to construct a tank in which a low-freezing solution was pumped through a heat-exchange coil until the solution became mushy. A second coil was immersed in the same tank and another solution was circulated through the second coil to exchange heat with the icy mass in the tank. This second solution was then pumped to a place of work where it passed through still a third heat exchanger. The plan was not practical because the two pumps and three heat exchangers required large amounts of power to operate and represented an initial investment quite as large as would be required by a straight increase in refrigerating capacity. Such difficulties have caused refrigerating engineers to use temperatures above the freezing point of the liquids used.

In practicing my invention, I use heat exchange means so designed as to offer small resistance to the passage of cooling liquids therethrough. I am able to still further reduce the amount of energy required for the operation of the system, by dividing the containing tank in such a manner that the cooling liquid will be aided in its circulation within the tank by a certain amount of "fly-wheel" action caused by the temperature differences of the liquid itself, whereby the warmer liquid in the tank and, consequently, the lightest, tends to rise while the colder and heavier portion of the liquid tends to settle in the tank. Thus the natural movement of the liquid greatly aids the action of the propeller.

I have also discovered that there is a very important relation between the concentrations of various low-freezing solutions and the refrigerant temperatures used in chilling such solutions. In other words, solutions of slight concentrations, when brought into contact with very low-temperature refrigerating surfaces, tend to soldify in large flakes or lumps closely packed or associated. As solutions of higher concentrations are used with the same refrigerating temperature, the resulting ice particles will be progressively smaller because of the affinity of molecules of the solvent and solute. As the concentration is increased, the ice particles tend to remain of molecular size and practically independent of each other. In other words, the more concentrated the solution, the smaller the ice particles that are solidified out. I have discovered that a solution composed of 10 to 12 per cent of sodium chloride in distilled water gives excellent results when used in connection with a refrigerant temperature of 10° F.; and that such a solution can be frozen, if circulated in contact with the heat exchange surface at a rate to prevent freezing thereon, to such an extent that fully 75% of the heat of fusion of the total amount of water in the solution, can be extracted without causing the solution to become lumpy or excessively thick and mushy.

Such a solution, or rather, solution and mixture of sodium chloride and ice, while it seems to flow freely, actually offers much greater resistance to flow through pipes and coils than the original solution before any of its was frozen. For this reason, and to avoid the expenditure of the large amounts of power required to pump the partly-frozen liquid alone, I have invented a system of mixing only enough of the partly-frozen solution with some of the warmer solution being returned from the working heat exchanger, as will result in a liquid mixture having the desired low temperature for return to the exchanger. In this manner the stored cooling units will absorb heat from the returning liquid and thus lower the temperature thereof to the desired low value with practically no ice particles remaining by the time the liquid reaches the working heat exchanger. Since the pipe leading to the 3-way mixing valve from the tank, may be short and relatively large in cross section, and since the liquid being circulated contains only a relatively small percentage of ice which percentage decreases continuously as the heat exchange cycle progresses, the mixture offers small resistance to flow and can be pumped with the same power required for an equal amount of unfrozen liquid.

In a concentrated solution of sodium chloride and water near the saturation point, practically no freezing occurs until the temperature of the solution reaches —6° F., because of the great affinity between the solute and solvent and also because of the fact that, in order to freeze any of the water in the solution, it is necessary that some of the salt be crystallized out. However, it is not economical to operate present-day refrigerating equipment at such low temperatures so that the values given in the preceding paragraphs, represent a comprise over the most desirable conditions from a purely theoretical thermodynamic point of view.

Thus my invention resides in part in the balanced relationship between the concentration of the solution and the temperature of the refrigerant, and affords a practical workable system a solution, may be utilized for storing large amounts of cooling energy in a form readily available for subsequent economical utilization by the simple modulation of relatively warm liquid with a certain percentage of solution containing ice crystals of minute or molecular size. With the concentration of 10 to 12%, and refrigerant temperature of 10° F., the solution will never become excessively thick and mushy. This is true even although it is not continuously circulated over and about the heat exchanger in the tank. Such circulation is necessary, largely to prevent the formation of ice upon the heat exchange surfaces and to maintain a high rate of heat transfer. While I have described the method in connection with solutions of sodium chloride, practically all anti-freeze solutions behave in a similar way so that, with a small amount of experimenting, the most desirable concentration and temperature for each specific solution, can readily be determined.

Referring particularly to Fig. 4, I have shown at 1, a refrigerating compressor unit of conventional design, mounted upon a support 1a and having a pipe 27 leading from liquid storage tank 1b to expansion coils 2 through a conventional expansion valve 2a. These coils are mounted within an open-ended cylinder 3 that, in turn, is horizontally mounted within and at the top of a closed upright cylindrical tank 4, covered with heat-insulating material 4a. In the particular construction shown, the cylinder 3 is positioned horizontally of the tank and has a length such that there is a clearance of approximately one foot between each end of the cylinder and the adjacent wall of the tank.

A shaft 6 is journaled in a bracket 6a and projects into the tank where it carries a propeller 5. The end of shaft 6 exterior of tank 4, carries a pulley 7 that is driven by a variable-speed device subsequently explained.

A plurality of cooling or chiller plates are mounted within tank 4 in a sloping position. These plates are hollow and form passageways between a first header 23 located in a sloping position within tank 4 substantially beneath the one end of cylinder 3, and a second header 23a parallel to header 23, and located near the bottom of the tank and substantially beneath the other end of cylinder 3. Header 23 is supplied by a pipe 24 passing through the wall of the tank and supplied with liquid refrigerant from pipe 27 through a standard reducing valve 24a. Bottom header 23a is connected by a return pipe 28 passing through the wall of the tank and communicating with suction or vapor line 25. It will be noted that, because of their slanting or sloping position within the tank, chiller plates 21, 22, etc. follow the natural circulation path of the liquid within the tank so that these plates help to produce a "flywheel" motion of said liquid. At the same time they assist in cooling the liquid by adding to the heat transfer surface of coils 2. Also, these plates will hold a substantial weight of ice after the temperature lowers to the point where the liquid begins to congeal and, as a result circulation of the liquid becomes sluggish. Furthermore, chiller plates 21, 22, etc. help to segregate the circulation when the liquid has been cooled to the point where the condensing unit will not extract heat from the liquid at the rate that they are being added by heat transfer from the load in the car or other compartment. This is because the plates tend to separate the circulation of relatively warm liquid in the top of the tank so that circulation thereof will not be as rapid in the colder liquid in the bottom of the tank since, to fall below the plates, the warmer liquid will have to cool below the temperature of the liquid on the under side of the plates.

Figure 5:
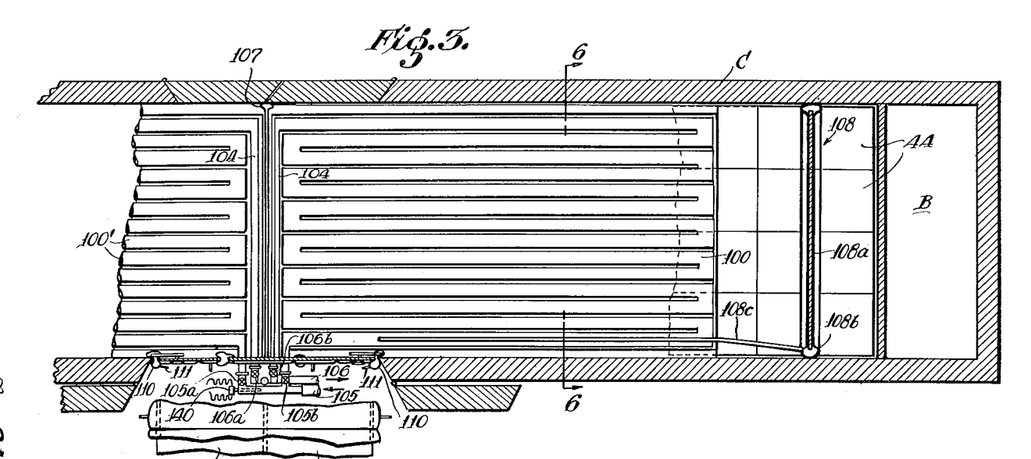
Fig. 5 is a plan view of Fig. 4 showing the tank and variable-speed means for driving the circulating propeller, the top of the tank being removed and parts therewithin being broken away to show the interior construction more clearly.

As shown at Fig. 5, a motor 8 is mounted upon parallel guide rods 12 and 13 for sliding movement toward and from pulley 7. Rods 12 and 13 are rigidly connected at their ends by cross pieces 12a and 13a to form a frame. A screw shaft 14 is journaled in cross piece 13a, between rods 12 and 13, for rotation upon an axis parallel to said rods. This shaft 14 engages a threaded aperture in the base of motor 8, so that, when shaft 14 is rotated, the motor is translated on and along said rods. Shaft 14 has a sprocket wheel 15 connected thereto. A repeater motor 17, such as a "Selsyn," is mounted adjacent shaft 14 and has a sprocket 17a fixed to its shaft. A chain 16 connects sprockets 15 and 17a whereby motor 8 is translated as repeater 17 is actuated. As shown at Fig. 4, suction line 26 is in communication with a controller 18. This controller may consist of a well known "Selsyn" transmitter connected to be operated by an element, such as a "Sylphon" responsive to the suction or absolute pressure in line 26. Motor 8 has a conventional spring sheave 9 upon its shaft, in alignment with pulley 7. As is well known, such sheaves consist of two frusto-conical halves, one of which is fixed upon the motor shaft and the other of which is slidably mounted upon said shaft and is urged toward the fixed half by spring mechanism. Thus, as screw 14 is operated to move motor 8 away from pulley 7, the tension in belt 10 passing over sheave 9 and pulley 7, acts to separate the two halves of the sheave against the action of the spring mechanism and to reduce the effective diameter of the sheave and the speed of rotation of pulley 7. Conversely, when screw shaft 14 is rotated to move motor 8 toward pulley 7, the spring mechanism acts to move the two halves of the sheave closer together to thereby increase the effective diameter of the sheave and increase the speed of rotation of pulley 7.

It is well known that the suction in the vapor or return line of a refrigerating unit decreases in proportion to the load on said unit or, stated in another way, the absolute pressure in said line varies inversely as the load on the unit. The connections are so made, that as the suction in line 26 decreases, controller 18 is correspondingly actuated to cause a rotation of repeater 17 in a direction moving sheave 9 toward pulley 7. Thus the effective diameter of the sheave is increased as well as the speed of rotation of the pulley 7 and propeller or agitator 5. Circulation of the liquid in tank 4 is thus increased. As the rate of heat exchange between coils 2 and the liquid in tank 4, is proportional to the product of the temperature difference between the liquid and the coils and the amount of liquid circulating over and about said coils per unit time, the load on the refrigerator unit 1 can be maintained more nearly uniform as the temperature difference decreases, by speeding up the rate of circulation. Stated in another way, the load curve on the refrigerator unit can be flattened out by speeding up the rate of circulation of chilled liquid over and about the coils as the temperature difference between the liquid and the coils 2 decreases because of progressing lowering of the temperature of the liquid or solution.

In addition to the foregoing features, an expansion or overflow tank 29 is located a little above the level of the top of tank 4 and has its bottom connected with the bottom of tank 4 by pipe sections 30 and 31. Tank 29 is provided with an access opening 32 that is normally closed by a removable cover 32a in which a vent 33 is located.

Figure 9:
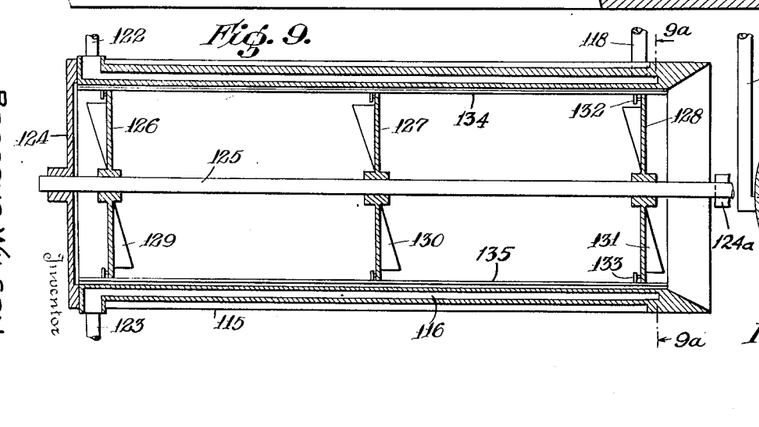
Fig. 9 is a cross section, taken on the line 9—9, Fig. 9a, and showing a modified form of propeller means for circulating cooling liquid within the tank of Fig. 4.
Figure 9A:
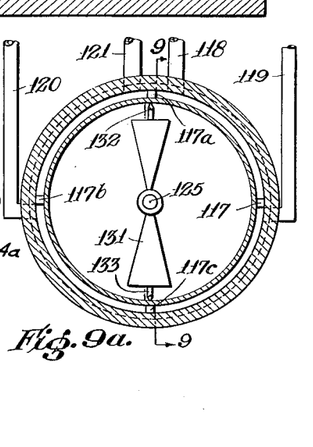
Fig. 9a is a sectional view taken upon the line 9a—9a Fig. 9.

At Figs. 9 and 9a I have shown a form of circulating and heat exchanging device that may be substituted for coils 2 and cylinder 3, in tank 4. This exchanger consists of a double-walled cylinder, 115 whose walls coact to form an annular space 116, divided by radial partitions 117, 117a, 117b and 117c, into four equal chambers. Each chamber has a supply pipe leading thereto at one end, such as 118 and 121, Fig. 9a, and an exhaust pipe leading therefrom, such as 122 and 123, at the other end. It will be understood that suitable expansion valves, not shown, are provided at the points where each supply pipe enters the cylinder. Frames 124 and 124a rotatably mount a shaft 125, concentric of the cylinder. This shaft carries propellers 126, 127 and 128 spaced therealong, each including blades 129, 130 and 131, respectively. Scraper blades as shown at 134 and 135 extend axially along and in contact with the interior of the cylinder 115, each blade being carried by brackets, attached to the adjacent portions of each propeller, as at 132 and 133. It will be understood that shaft 125 may be driven by a variable-speed drive, such as that shown at Fig. 5.

The three-way mixing valves 36 and 38, located at the outlets 31 and 39 of tank 4, are each controlled by thermostats 140 and 141, respectively, in the pipes leading to the heat exchangers 100 and 64, so that the proper percentage of mixture is added from tank 4 into the warmer liquid returning from the heat exchangers. This keeps the resulting mixture at the desired low entrance temperature for a considerable period of time. The refrigerator unit 1 may, of course, be operated at any time desired and at full capacity whether or not such capacity is immediately required for maintaining the desired entrance temperatures of the cooling liquid. Any excess capacity results in the formation of additional ice particles within the tank 4 and results in cooling capacity that may be subsequently utilized as desired.

In operation, as liquid refrigerant evaporates within the chambers formed by the double-walled cylinder, a flow of liquid through the cylinder is induced by the rotating propellers. Because of the constant agitation the liquid is gradually reduced to an agglomeration of minute ice particles, and maximum cooling energy is stored therein while maintaining the mixture sufficiently fluid to be pumped. Blades 134 and 135 act to prevent the adherence of ice to the heat exchange surfaces of the cylinder.

It will now be clear that I have invented an integral, unitary system of pre-cooling large masses of perishable products, and one that is rapid and positive in action and efficient and economical in use. The rapid pre-cooling to the desired low temperature slows up the enzyme action of fruits and vegetables after harvesting, and results in the delivery at the point of sale, of a larger percentage of wholesome, saleable products than was possible with previously-known systems. The flexibility of my system enables the refrigerating plant to be operated at near-peak efficiency at all times.

In the specification, the term "aggregate mass" means the entire mass of the solution, including ice crystals and solvent, together with any unsolidified solution. The term "flow point" means the condition of aggregate mass at which it can be pumped or moved through piping and coils by the application of pressure differences along its path of flow.

While I have disclosed a preferred form of the invention, numerous changes, alterations, and substitutions will occur or be obvious to those skilled in the art. The foregoing disclosure is to be taken in an illustrative and not a limiting sense and I wish to reserve all such modifications and substitutions as fall within the scope of the sub-joined claims.

Having now fully disclosed my invention, what I claim as new and desire to secure by Letters Patent is:

1. In a pre-cooler for railway refrigerator cars, means forming a chamber having first and second opposed side walls, and a top and bottom, a trapezoidal plate extending between said side walls in substantially parallel relation with and intermediate said top and bottom, a first opening in said first wall and having its lower edge coincident with the longer side of said plate, a second opening in said second wall and having its lower edge coincident with the shorter side of said plate, means forming first and second ducts in adjacent, side-by-side relations, secured within said first opening and including a partition having one end edge normal to and intermediate the ends of the long edge of said plate, a supply duct secured within said second opening, first, second, third and fourth series of pivoted shutters in said chamber adapted, when closed with contiguous edges in contacting relation, to form walls respectively, (1) between corresponding first side edges of said openings, one side edge of said plate and the top of said chamber, (2) between the first side edge of said second opening, said partition, plate, and the top of said chamber, (3) between the second side edge of said second opening, said partition, plate and the top of said chamber (4) between the corresponding second side edges of said openings, the other side edge of said plate and the top of said chamber, and means connecting the shutters of each series for movement in unison between open and closed positions.

2. The device as recited in claim 1, and means connecting the shutters of all said series, whereby the shutters of said first and third series are open when the shutters of said second and fourth series are closed, and vice versa.

BROADUS WILSON.

REFERENCES CITED

The following references are of record in the file of this patent:

UNITED STATES PATENTS

| Number | Name | Date |
| --- | --- | --- |
| 520,226 | Weyhe | May 22, 1894 |
| 806,778 | Clewer | Dec. 12, 1905 |
| 843,909 | Peters et al. | Feb. 12, 1907 |
| 875,007 | Speilberger | Dec. 31, 1907 |
| 984,553 | Gay | Feb. 21, 1911 |
| 1,848,811 | Welch | Mar. 8, 1932 |
| 1,954,239 | Doherty | Apr. 10, 1934 |
| 2,050,597 | Younger | Aug. 11, 1936 |
| 2,194,694 | Denker | Mar. 26, 1940 |
| 2,198,449 | Atkins | Apr. 23, 1940 |
| 2,228,999 | Birdseye | Jan. 16, 1941 |
| 2,293,316 | Stebbins | Aug. 18, 1942 |
| 2,293,360 | Reilly et al. | Aug. 18, 1942 |
| 2,346,931 | Mann | Apr. 18, 1944 |
| 2,370,886 | Solberg | Mar. 6, 1945 |
| 2,397,232 | Barnes et al. | Mar. 26, 1946 |
| 2,439,487 | Reilly | Apr. 13, 1948 |

FOREIGN PATENTS

| Number | Country | Date |
| --- | --- | --- |
| 359,151 | Great Britain | Oct. 22, 1931 |